United States Patent
Spears et al.

(10) Patent No.: US 6,293,724 B1
(45) Date of Patent: Sep. 25, 2001

(54) ADJUSTABLE MOUNT FOR VEHICULAR BALL JOINTS

(75) Inventors: Thomas G. Spears, Burr Ridge, IL (US); James R. Ryshavy, Cologne, MN (US)

(73) Assignee: Northstar Manufacturing Co., Inc., Minnetonka, MN (US)

( * ) Notice: Subject to any disclaimer, the term of this patent is extended or adjusted under 35 U.S.C. 154(b) by 0 days.

(21) Appl. No.: 09/429,825

(22) Filed: Oct. 29, 1999

(51) Int. Cl.[7] .............................. F16C 11/00; F16D 1/12; B62D 17/00
(52) U.S. Cl. .............. 403/122; 280/86.751; 280/86.756; 403/DIG. 8; 403/161; 403/76
(58) Field of Search ................................ 403/119, DIG. 8, 403/76, 161; 280/86.756, 86.755, 86.754, 93.511

(56) References Cited

U.S. PATENT DOCUMENTS

| | | | |
|---|---|---|---|
| 656,314 | * 8/1900 | Beerbower | 403/DIG. 8 |
| 1,646,288 | * 10/1927 | Graham | 403/DIG. 8 |
| 1,768,347 | * 6/1930 | Trumble | 403/76 X |
| 2,198,544 | * 4/1940 | Leighton | 403/118 |
| 2,507,108 | * 5/1950 | Lange | 403/143 X |
| 2,900,196 | * 8/1959 | Nienke | 403/161 X |
| 3,124,370 | * 3/1964 | Traugott | 403/343 X |
| 3,273,909 | * 9/1966 | Muller et al. | 280/86.751 |
| 3,526,413 | 9/1970 | Muller . | |
| 3,887,211 | * 6/1975 | Mazur | 280/86.756 |
| 4,162,859 | * 7/1979 | McAfee | 403/75 |
| 4,202,564 | * 5/1980 | Strader | 280/86.756 |
| 4,226,440 | * 10/1980 | Chappell et al. | 280/124.134 |
| 4,232,880 | * 11/1980 | Dickerson et al. | 403/161 X |
| 4,509,772 | * 4/1985 | Drotar et al. | 280/86.756 |
| 4,663,980 | * 5/1987 | Narita | 403/76 X |
| 4,836,574 | * 6/1989 | Ingalls | 403/161 X |
| 4,875,697 | * 10/1989 | Miller | 403/75 X |
| 4,921,271 | * 5/1990 | Berry et al. | 403/96 X |
| 5,316,332 | * 5/1994 | Ingalls | 280/86.756 |
| 6,047,789 | * 4/2000 | Iwanaga | 280/86.758 |
| 6,224,075 | * 5/2001 | McIntyre | 280/86.751 |

FOREIGN PATENT DOCUMENTS

A-50515/90   2/1990   (AU) .
B-64323/96   1/1997   (AU) .

* cited by examiner

Primary Examiner—Lynne H. Browne
Assistant Examiner—Ernesto Garcia
(74) Attorney, Agent, or Firm—Haugen Law Firm PLLP

(57) ABSTRACT

An adjustable ball joint assembly to be secured between the wheel and the apex of an upper control arm member of a motor vehicle suspension system to provide for camber/caster adjustment of motor vehicles with altered suspensions, typically lowered suspensions. The adjustable ball joint includes a ball joint retainer body including a locking plate and with an eccentrically positioned ball socket (opening) formed in the bottom surface of the plate. A stub shaft, fast on the top surface of the locking plate, extends upwardly, with an arcuately configured annular groove formed around its periphery. A tapered boss is positioned adjacent the top surface of the locking plate and configured to be received within the ball joint port of the control arm. At least two locking screws with threaded shanks threadably engaged through the locking plate extend parallel to the wheel axis, with the shank portions being spaced apart a distance such that when advanced, the threaded shanks forceably and threadably engage the inner root diameter of the arcuate groove for locking engagement of the stub shaft within the locking plate.

3 Claims, 4 Drawing Sheets

ADJUSTABLE MOUNT FOR VEHICULAR BALL JOINTS

BACKGROUND OF THE INVENTION

The present invention relates generally to an improved ball joint adaptor for vehicle suspensions, and more particularly to an improved upper ball joint/adaptor plate which facilitates camber and caster adjustment in vehicles with altered suspensions, particularly those with a lowered chassis. The ball joint adaptor device of the present invention is readily and accurately attached to the factory supplied control arm, and facilitates ease of installation along with adjustability of both camber and caster in ranges of up to two degrees.

The present invention is particularly adapted for installation on vehicles with steerable front wheels, and wherein the wheels are suspended from the chassis in part by guide members typically characterized as control arms. A ball joint is normally employed as part of the suspension system, with the ball joint being coupled between the control arm and the wheel assembly. Adjustment of the linkage between the control arm and the wheel assembly will, in turn, be reflected in achieving appropriate alignment parameters, including camber and caster.

Various types of eccentric adjusting devices have been known and utilized in the past, however these prior art devices are typically designed for use in conventionally configured vehicles, and are not compatible with vehicles having altered suspension heights. Vehicle suspension heights are frequently altered either through long-term use under heavy load conditions, or more commonly, through intentionally altered lowered suspensions. When these height modifications and alterations occur, it has been found difficult to provide for adjustment of the wheel alignment parameters, particularly camber and caster, with these difficulties arising due to the adoption of configurations not contemplated by the original factory equipment. When wheel alignment parameters fall out of the specified range, the drivability and control of the vehicle deteriorates and excessive tire wear may occur. The present invention provides a convenient means for accommodating and maintaining proper and correct adjustment of alignment parameters of altered or modified vehicles, with the adjustment being rugged, reliable, and readily facilitated by technicians.

In addition to these features, the configuration of the components utilized in the present invention is such that the suspension may be adapted for use even in drastically lowered suspensions. The adjustable ball joint means of the present invention includes a tapered upper clamping plate or washer which significantly reduces the height of the overall adjustment assembly relative to other fixed-in-place components so as to eliminate or reduce undesired contact between the adjustment device and other fixed components of the vehicle.

SUMMARY OF THE INVENTION

The embodiment of the present invention, particularly as set forth herein, discloses the use of the invention in the upper wishbone type control arm member of a motor vehicle suspension system. It will be recognized and realized by those of skill in the art that the system is designed for use in connection with control arm members of other configurations. For example, the features of the present invention may be utilized in combination with control arm members which may be configured in a generally "U"-shaped form with substantially parallel arms extending from pivotal attachment point to the chassis.

In accordance with the present invention, an adjustable ball joint system is provided and arranged to be coupled between the wheel assembly and the apex of the upper control arm member, with the device being particularly well adapted for use on those vehicles in which the chassis height has been significantly lowered from the original factory specification. The ball joint system or means of the present invention enables the re-establishment of proper wheel camber, since chassis lowering has the effect of modifying the camber setting significantly beyond the capability of readjustment from the typical factory-installed system. This is due to the fact that the suspensions in most motor vehicles do not provide for any significant adjustment or repositioning of the points about which the operating components may pivot. Accordingly, proper wheel alignment in these modified vehicles is not readily subject to correction and/or adjustment.

A feature of the present invention is to provide an adjustable ball joint support system wherein the angle at which the ball joint support mates with or attaches to the vehicle control arm is changed so as to accommodate the lowered chassis. In this connection, a tapered or canted boss is provided which corrects the angular relationship established between the transverse axis of the control arm and the repositioning of the ball joint assembly including the ball joint stem.

An improved and adjustable locking means is also provided between the ball joint socket or retainer and the components secured to the control arm. Specifically, the apparatus of the present invention provides a pair of locking screws which advance toward and into contact with an annular recess formed in a stub shaft which is fast on a locking plate which forms a portion of the ball joint retainer. Indeed, the contact between the locking screws and the annular recess in the shaft is such that the screws cut threaded grooves into the recess so as to both establish and retain the angular relationship between the ball joint retainer and the stub shaft. In other words, the ball joint retainer body includes a locking plate with a stub shaft extending axially upwardly. An arcuately configured annular groove is formed around the periphery of the stub shaft, and the locking screws are positioned so as to engage and cut threaded grooves into the base of the annular recess in order to lock the ball joint retainer securely into its properly adjusted position on the control arm. The combination of the tapered boss and the locking screws contribute to the capability of the device to modify, alter, and correct the angle at which the ball joint and its stem couple the wheel assembly to the vehicle control arm.

Therefore, it is a primary object of the present invention to provide an improved adjustable ball joint mounting means which is adapted for use in connection with vehicles having lowered chassis, with the adjustable ball joint means facilitating proper adjustment of wheel alignment parameters including, in particular, camber and caster.

It is a further object of the present invention to provide an improved adjustable ball joint means to be secured between the wheel assembly and the apex of an upper control arm of a motor vehicle suspension system, wherein the adjustable ball joint means is designed to provide for firm, fast, and reliable retention on the control arm, along with the capability of reliably retaining and preserving alignment parameters.

Other and further objects of the present invention will become apparent to those skilled in the art upon a study of the following specification, appended claims, and accompanying drawings.

IN THE DRAWINGS

Figure 6:
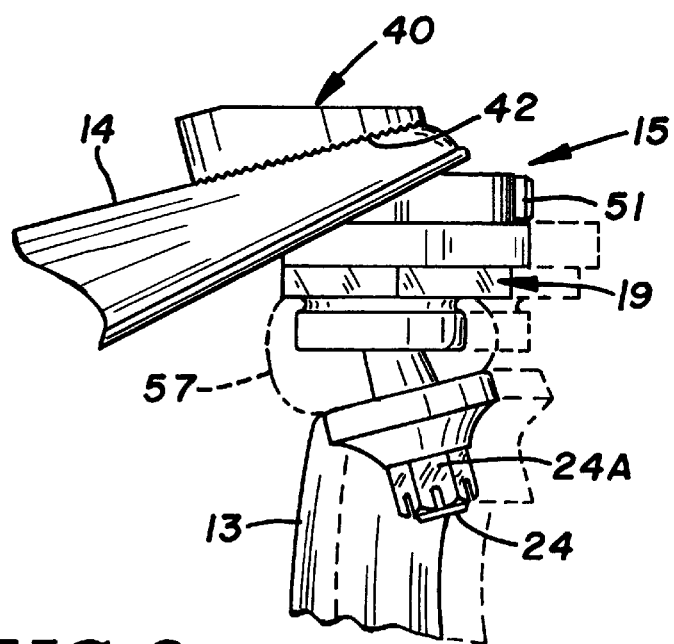
Figure 6:
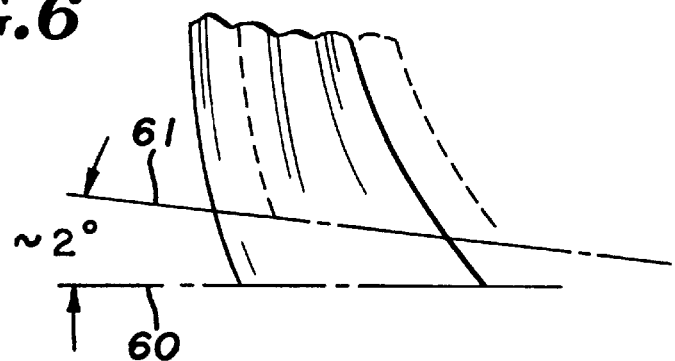
Figure 7:
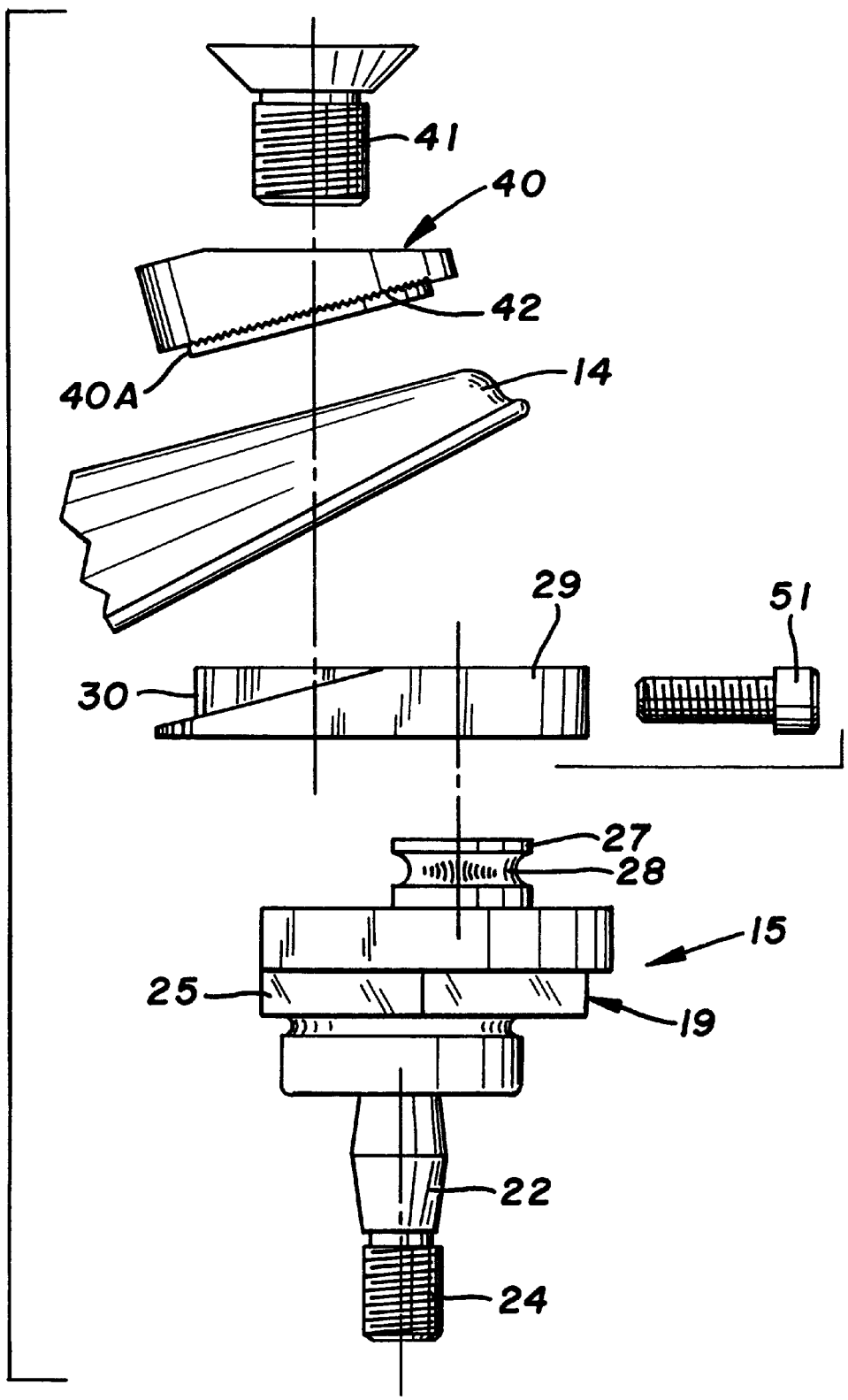

FIG. 6 is a front elevational view of the apparatus of the present invention as coupled to the upper control arm, with a portion of the control arm being shown cut-away, and further illustrating the alignment correction available for maximum camber correction; and FIG. 7 is an exploded view of the individual components used in forming the overall assembly of the adjustable ball joint means of the present invention.

DESCRIPTION OF THE PREFERRED EMBODIMENT

Figure 1:
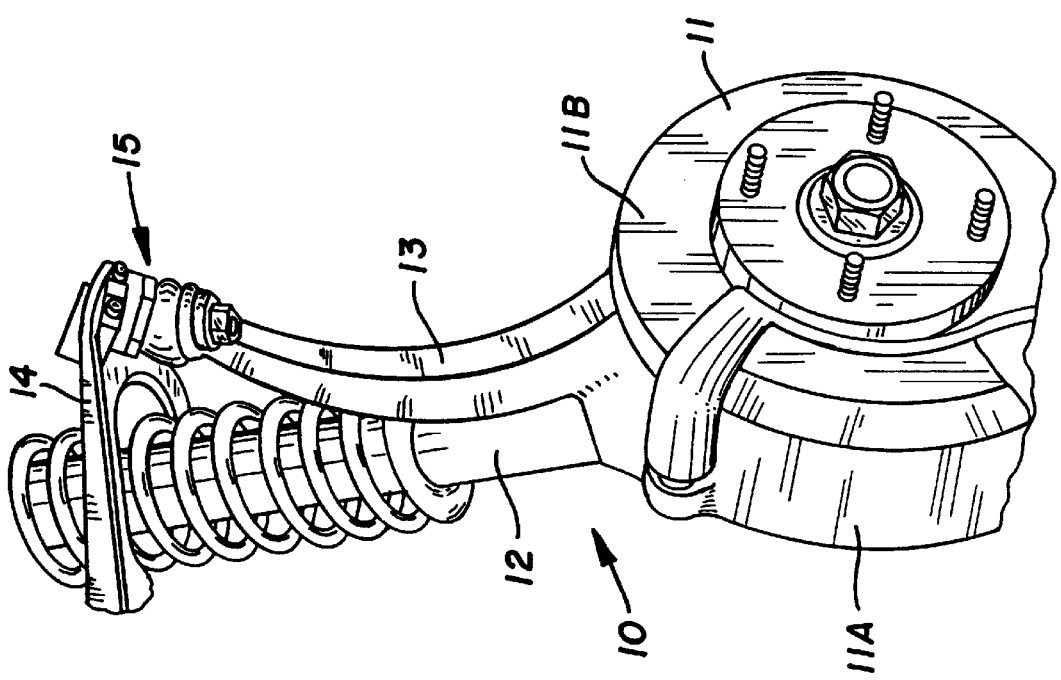
FIG. 1 is a perspective view of a strut-equipped wheel assembly for a motor vehicle, and illustrating the arrangement of the wheel assembly, the upper ball joint support bracket, and the upper control arm together with the adjustable ball joint means of the present invention installed thereon.

In accordance with the preferred embodiment of the present invention, and with particular attention being directed to FIG. 1 of the drawings, a front assembly generally designated 10 is shown which includes a wheel assembly 11, a strut assembly 12, and an upper ball joint support bracket 13, with wheel assembly 11 including a brake caliper 11A and a brake disc 11B. Upper control arm 14 is provided which, in turn, is coupled to the upper ball joint support bracket 13 by means of the adjustable ball joint arrangement of the present invention shown generally at 15. As can be appreciated, the upper control arm 14 is a factory unit with the original factory ball joint removed and replaced with the present invention.

As is typical in installations of this type, and as known in the art, the inner tops of each individual arm of upper control arm 14 is mounted for pivotal up-and-down movement relative to the motor vehicle chassis through and about a horizontal axis located at the chassis. This horizontal axis extends generally parallel to the driving axis of the motor vehicle. Control arm 14 also has a central or cross-axis which extends transversely to the driving axis. This transverse or central axis is shown at 17 in FIG. 3, and as is apparent, the transverse or cross-axis of control arm 14 is substantially coaxial with the axis of the steerable wheel axle when n straight forward driving position.

Figure 2:
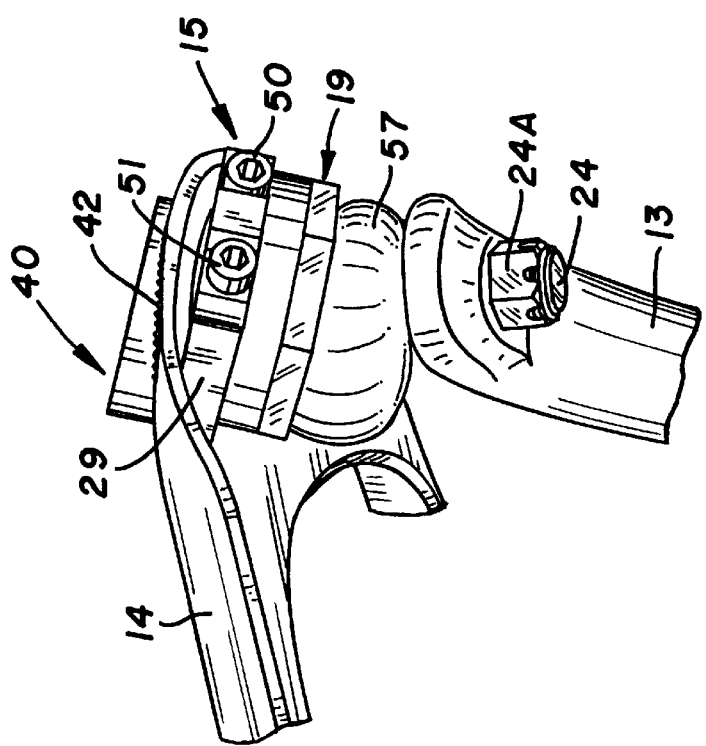
FIG. 2 is a detail perspective view, on a slightly enlarged scale, and illustrating the details of the adjustable ball joint means of the present invention as mounted within the upper control arm.
Figure 3:
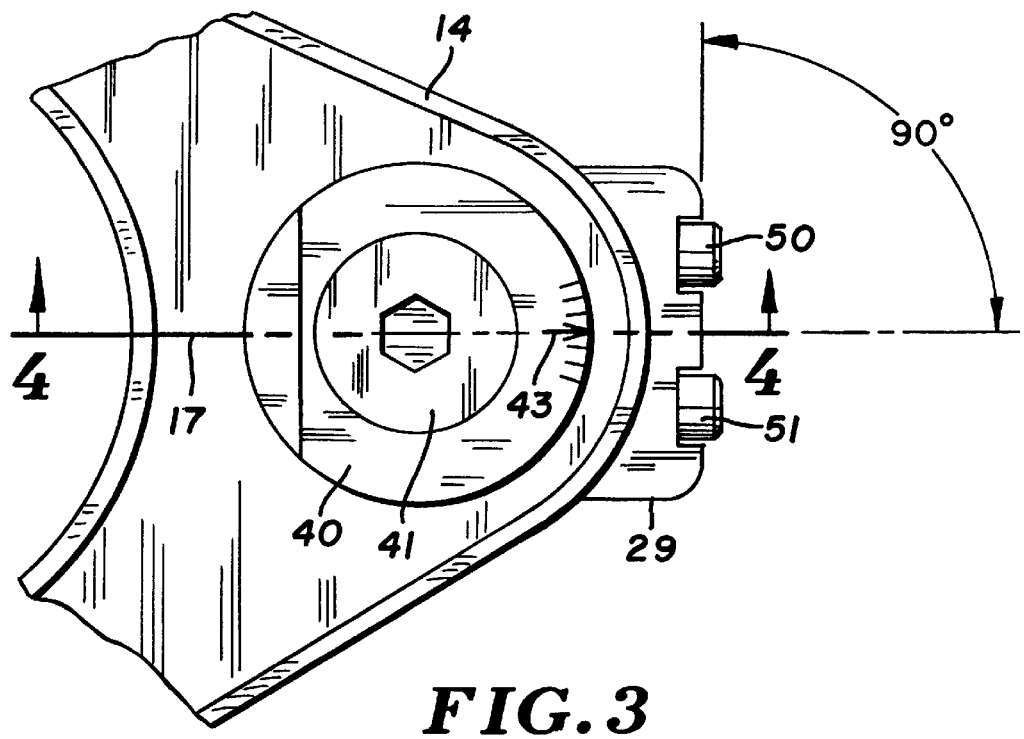
FIG. 3 is a top plan view of the adjustable ball joint means as secured on the upper control arm.
Figure 4:
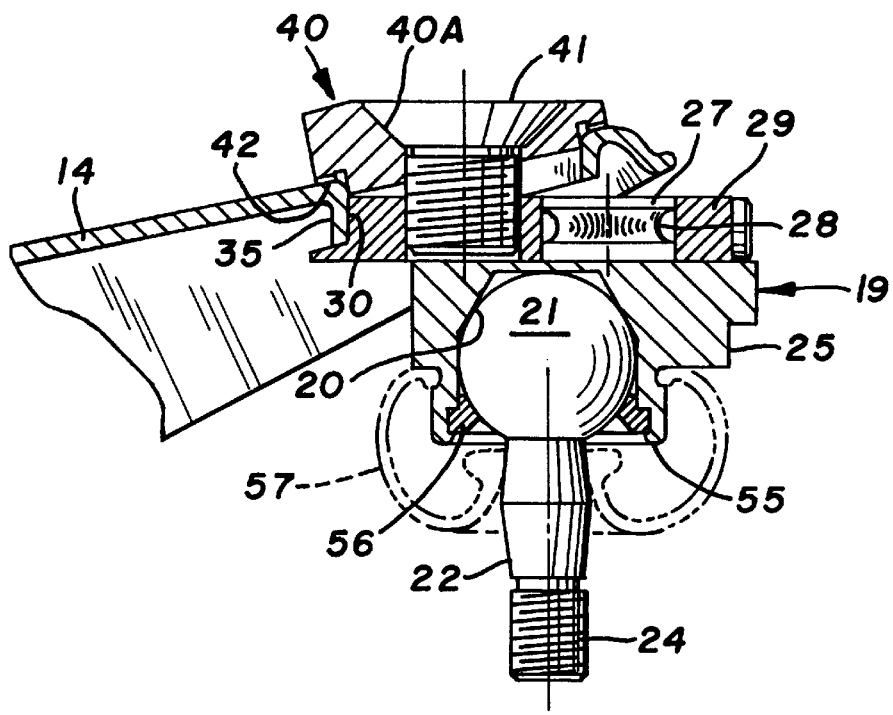
FIG. 4 is a vertical sectional view taken along the line and in the direction of the arrows 4—4 of FIG. 3, with this view being taken through the central axis of the control arm and perpendicular to the control arm pivot, with FIG. 4 further illustrating, in phantom, the weather-proof rubber boot provided for protective isolation of the ball joint components.

With attention being further directed to FIGS. 2, 3 and 4, it will be seen that the adjustable ball joint system 15 includes a ball joint retainer socket or unit body generally designated 19 in which is formed a ball receiving port or socket 20, and with FIG. 4 illustrating the ball component 21 in place within port 20. Ball stem 22 is further illustrated in FIG. 4, with the threaded distal tip end 24 being designed for direct coupling to the upper tip end of ball joint support bracket 13. Threaded distsal tip end 24 is secured to support bracket 13 by nut 24A as shown in FIG. 2. Ball receiving port or socket 20 is eccentrically positioned in the bottom surface of plate 25. In other words, locking plate 25 includes an annular body portion circumscribing the eccentrically positioned ball receiving port 20. A stub shaft member 27 is fast on unit body 19 and extends axially upward from the top surface thereof. Stub shaft 27 has an annular groove formed therein as at 28, with the groove being arcuate in its configuration, and extending around the entire periphery of stub shaft 27. It will be further observed that the axis of stub shaft 27 is parallel to and spaced from the center line of the ball receiving port 20. Stub shaft 27 is received within a bore formed in locking plate 29. A tapered boss is provided at 30, with the boss 30 being configured for centering plate 29 within annular shoulder or ring 35 of control arm 14. Boss 30 is tapered, as indicated, with the upper and lower surfaces thereof being angularly disposed, one to another, at about 15 degrees. It is this angular disposition which creates the necessary deflection between the plane of control arm 14 and the angular disposition of locking plate 29. As shown in FIG. 7, one portion of the retainer socket or unit body 19 is hex-shaped so as to facilitate rotation of body 19 about the axis of stub shaft 27.

Washer generally designated 40 is preferably in the form of a tapered top plate, which has a bore formed therein to receive locking and mounting cap screw 41 therewithin. With reference to FIG. 7, it will be observed that washer 40 is provided with a centering boss as at 40A, with this boss being utilized to center washer 40 within the opening formed in the apex of control arm 14. In order to reduce the overall height of the adjustable ball joint of the present invention, washer or upper plate 40 is likewise tapered at an angle of about 15 degrees so as to be generally complimentary to that angular taper of locating boss 30. Washer or upper plate 40 is provided with radial serrations as at 42 in order to establish firm motion resisting engagement between member 40 and the upper surface of control arm 14. Also, as is indicated in FIG. 3, the exposed surface of washer or plate 40 is provided with a strike mark to more readily establish the desired alignment between the adjustable ball joint assembly and that of control arm 14. As indicated in FIG. 3, such a strike mark is shown as at 43. Additional strike marks may be provided as shown in arcuate spaced relationship to center strike mark 43. Stated another way, a portion of tapered washer 40 is mounted against the upper surface of control arm 14, with radial serrations on the undersurface thereof being provided to establish and retain locking engagement between washer 40 and control arm 14.

Figure 5:
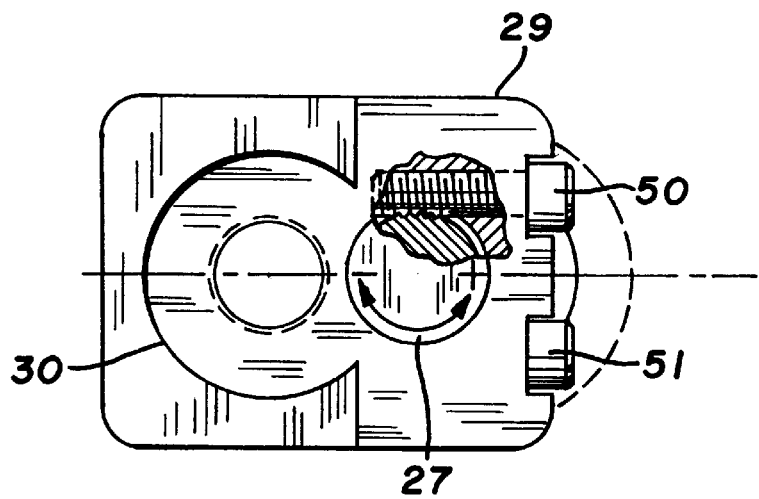
FIG. 5 is a top view of the angled locking plate assembly, with the locking plate assembly being removed from the control arm, and further illustrating, in cut-away form, the relationship between the locking screws and the stub shaft component.

With continued attention being directed to FIGS. 3 and 4, and with additional attention being directed to FIG. 5, at least tow locking screws 50 and 51 being threadably engaged within bores formed in the body of locking plate 29. As shown in FIG. 5, it will be observed that the outer threaded periphery of the shank portions of locking screws 50 and 51 are in physical engagement and contact with the root diameter of the peripheral groove 28 formed in stub shaft 27. When advanced along the threaded bore of locking plate 29, locking screws 50 and 51 cot or form threads in the groove and thus provide a reliable and convenient retention lock.

By way of further detail, the axes of locking screws 50 and 51 extend generally parallel to the wheels axis (when in straight forward driving disposition) and with the elongated axes being spaced apart a distance such that the threaded shanks forceably and threadably engage the inner root diameter of arcuate groove 28 formed in stub shaft 27. Preferably, the radius of arcuate groove 28 substantially screws 50 and 51.

As indicated in FIG. 4, body 19 is provided with an inwardly rolled edge as at 55 so as to engage and hold retaining ring 56 firmly in place. Retaining ring 56, in turn, holds and retains ball member 21 within socket or port 20. Rubber boot 57 further provides weather-proof and dust protection for the assembly.

With attention now being directed to FIG. 6 of the drawings, adjustable ball joint assembly 15 is mounted in place between upper ball joint support bracket 13 and control arm 14. FIG. 6 illustrates the camber correction which may be achieved and facilitated by means of the present invention. In this connection, the solid line portions and the phantom line portions illustrate the manner in which a 2-degree camber change may be achieved, with lines 60 and 61 being projected from and coaxial with the front spindle axis. A maximum camber change or correction is achieved when alignment is consistent with that shown at 61. A camber change or correction up to three degrees may be achieved by means of the present invention, with portions of the correction being obtained by positioning of the upper washer 41 and a portion by rotational positioning of stub shaft 27.

In order to provide a correct positioning of ball member 21 relative to control arm 14, stub shaft 27 is rotated in either clockwise or counter-clockwise direction, as illustrated in FIG. 5. Positive camber change may be obtained with counter-clockwise rotation from the disposition illustrated in FIG. 5, with negative camber change or correction being obtained by a clockwise rotation. As indicated hereinabove, a portion of unit body 19 is in a six-sided or hex configuration so as to aid in rotation of this portion of the assembly.

INSTALLATION INSTRUCTIONS

By way of typical installation, the following steps are recommended to be undertaken by the technician:

1. Position vehicle at alignment height. Lift front end with a jack under the body structure so suspension hangs freely.
2. Spray upper ball joint fasteners with penetrant.
3. Remove upper ball joint cover, cotter pin and nut.
4. Using a suitable tool, break taper between ball joint and ball joint support bracket of steering knuckle.
5. Secure the steering knuckle from swinging outward to prevent constant velocity (CV) shaft from pulling out.
6. Make reference mark at most outward point of control arm to establish transverse axis of control arm.
7. Using a ball joint press and special adaptor set, press factory ball joint from upper control arm.
8. Slightly loosen pivot bolts and nuts, about one-half turn.
9. Insert ball joint plate into control arm from bottom. Place upper washer on top of control arm with strike mark aligned with reference mark. Align center of locking plate 29 with reference mark. Install Allen bolt 41 through washer into plate 29.
10. Holding plate 29 with large crescent wrench or channel locks, torque Allen bolt to 100 ft. lbs. (136 n.m.).
11. Install the ball joint and body 19 into the ball joint plate. Place a holding pin into either of threaded bores for locking screws 50 and 51 to retain the ball joint until final adjustment.
12. Install the dust boot onto the ball joint, fitting into a groove formed in the ball joint housing (body 19).
13. Install the ball joint stem through the upper ball joint support bracket. Install and torque the nut to 30 ft. lbs. (44 n.m.) and insert cotter pin through nut. Install cover over nut.
14. Re-install the wheel assembly.
15. Carefully lower the vehicle, checking for clearance at the outer end of the control arm. The plastic inner fender liner and inner fender lip may need to be modified to gain clearance.
16. Install alignment equipment and determine camber/caster changes required.
17. Using alignment equipment manufacturers suggested procedure, raise vehicle so suspension hangs freely and support safely.
18. Rotate the ball joint until desired change ahs been obtained.
19. Lower vehicle and verify proper camber/caster readings and tighten inner control arm pivot bolts and nuts.
20. Raise vehicle and install one of the locking screws 50 and 51 (preferably an Allen head bolt) in threaded bore in locking plate 29 and torque to 150 in. lbs. (17 n.m.).
21. Remove holding pin in locking plate 29 and install and torque second locking screw (Allen head bolt) to 150 in. lbs. (17 n.m.).
22. Proceed with the rest of the alignment and road test the vehicle.

SUMMARY

It will be appreciated that the examples provided herein are given for purposes of illustration only and are not to be otherwise construed as a limitation upon the scope to which the present invention is entitled.

What is claimed is:

1. Adjustable ball joint means for being secured between a wheel and a apex of an upper control arm member of a motor vehicle suspension system, and wherein the control arm member is mounted for pivotal up-and-down movement relative to the motor vehicle chassis along a horizontal axis which extends generally parallel to the driving axis of the motor vehicle, with said control arm member having a cross-axis extending generally transversely to said driving axis, and substantially coaxially with the wheel axis, a ball joint port formed in said control arm with the diameter being along said transverse axis, and wherein the ball joint means is adjustably mounted to the control arm, with the axis of the ball member of the ball joint means being generally parallel to the cross-axis of said control arm and with the ball joint means having stem means for coupling to one end of a wheel assembly including a wheel with spindle and axis; said adjustable ball joint means comprising:

(a) a ball joint retainer body with an eccentrically positioned opening formed in a bottom surface thereof and an annular body circumscribing said eccentric positioned opening;

(b) a ball joint having a ball stem with a ball member at one end thereof, the ball member being received within the eccentrically positioned opening formed in said ball joint retainer body;

(c) a stub shaft fast on said ball joint retainer body and extending axially upwardly therefrom, said stub shaft having an arcuately configured annular groove formed around a periphery thereof, and an axis of said stub shaft being parallel to and spaced from a center line of said eccentrically positioned ball receiving opening;

(d) a locking plate with a tapered boss portion positioned along a top surface of said ball joint retainer body and said tapered boss portion being adapted to be operably received within the ball joint port of said control arm;

(e) a tapered washer coupled to said locking plate through said tapered boss portion and a portion thereof being adapted to be operably mounted against an upper surface of said control arm, and a boss portion of said tapered washer being adapted to be operably engaged within said ball joint port, said tapered washer having a diameter adapted to be greater than the diameter of said ball joint port and with an annular contact zone adapted to be adjustably and operably positioned against the upper surface of said control arm; and (f) at least two locking screws with threaded shanks threadably engaged to said stub shaft through said locking plate for being disposal generally parallel to the said wheel axis, and said locking screws being spaced apart a distance such that the threaded shanks forceably and threadably engage an inner root diameter of the arcuate groove formed within said stub shaft for lockingly engaging said stub shaft within said locking plate.

2. The adjustable ball joint means of claim 1 wherein said tapered washer is provided with a reference mark on the upper surface thereof for indicating alignment with the cross-axis of said control arm.

3. The adjustable ball joint means of claim 1 wherein said eccentrically positioned opening for said ball joint means is provided with a retainer means for engaging and retaining said ball member within said eccentrically positioned opening.

* * * * *